(12) United States Patent
Mannheim Astete et al.

(10) Patent No.: US 12,036,847 B2
(45) Date of Patent: Jul. 16, 2024

(54) VEHICLE GLAZING HAVING A SHARPLY CURVED PORTION AND THE METHOD FOR BENDING

(71) Applicant: AGP America S.A., Ciudad de Panama (PA)

(72) Inventors: Mario Arturo Mannheim Astete, Lima (PE); Jean-Marie Le Ny, Lima (PE)

(73) Assignee: AGP America S.A., Panama (PA)

( * ) Notice: Subject to any disclaimer, the term of this patent is extended or adjusted under 35 U.S.C. 154(b) by 45 days.

(21) Appl. No.: 16/958,702

(22) PCT Filed: Dec. 31, 2018

(86) PCT No.: PCT/IB2018/060744
§ 371 (c)(1),
(2) Date: Jun. 27, 2020

(87) PCT Pub. No.: WO2019/130284
PCT Pub. Date: Jul. 4, 2019

(65) Prior Publication Data
US 2020/0346524 A1    Nov. 5, 2020

Related U.S. Application Data (60) Provisional application No. 62/612,522, filed on Dec. 31, 2017.

(30) Foreign Application Priority Data

Mar. 1, 2018    (CO) .................. NC2018/0002408

(51) Int. Cl.
*B60J 1/00*    (2006.01)
*B32B 3/30*    (2006.01)
(Continued)

(52) U.S. Cl.
CPC ......... *B60J 1/001* (2013.01); *B32B 17/10036* (2013.01); *B32B 17/10091* (2013.01);
(Continued)

(58) Field of Classification Search
CPC ..... B60J 1/001; B60J 1/008; B32B 17/10036; B32B 17/10091; B32B 17/10119;
(Continued)

(56) References Cited

U.S. PATENT DOCUMENTS 3,700,542 A    10/1972 Davis
4,909,820 A *    3/1990 Hirotsu ............... C03B 23/0305
                                              65/273

(Continued)

FOREIGN PATENT DOCUMENTS

DE    102007012146 A1    9/2008

OTHER PUBLICATIONS

2007 Peugeot 308 RC Z-Concept ; 2007; Conceptcars.com; pp. 1-2 (Year: 2023).*

(Continued)

*Primary Examiner* — Tahseen Khan
(74) *Attorney, Agent, or Firm* — The Morales Law Firm; Joseph L. Morales (57) ABSTRACT

The present invention discloses a vehicle glazing having a sharply curved portion and the method for bending such glazing. The sharply curved portion of the glass may extend along the surface of the glass. The sharply curved portion is obtained by locally heating by means of a laser source, heating the portion of the glass to a temperature sufficiently high enough to allow said portion of glass to bend. In preferred embodiments, the sharply curved portion comprises a first bent portion described by a first radius and a second bent portion described by a second radius, wherein the point where the radiuses of the first and second bent (Continued)

portions change their orientation generate an inflection point. The radius of curvature of the first and second bent portions is of less than 150 mm.

17 Claims, 7 Drawing Sheets

(51) Int. Cl.
*B32B 17/10* (2006.01)
*C03B 23/025* (2006.01)
*C03B 23/03* (2006.01)
*C03B 23/035* (2006.01)

(52) U.S. Cl.
CPC .. *B32B 17/10119* (2013.01); *B32B 17/10889* (2013.01); *B60J 1/008* (2013.01); *C03B 23/0258* (2013.01); *C03B 23/0307* (2013.01); *C03B 23/0357* (2013.01)

(58) Field of Classification Search
CPC ..... B32B 17/10889; B32B 3/263; B32B 3/28; B32B 3/30; Y10T 428/24479; Y10T 428/24521; Y10T 428/24529; Y10T 428/24612; Y10T 428/24628; Y10T 428/24942; Y10T 428/2495
USPC ........ 428/156, 161, 162, 172, 174, 212, 213
See application file for complete search history.

(56) References Cited

U.S. PATENT DOCUMENTS

| | | | | |
|---|---|---|---|---|
| 5,069,734 | A | * | 12/1991 | Kavanagh ............... B29C 51/36 |
| | | | | 156/99 |
| 5,108,480 | A | | 4/1992 | Sugiyama |
| 5,529,654 | A | * | 6/1996 | Kavanagh ......... B32B 17/10889 |
| | | | | 156/99 |
| 2012/0094084 | A1 | | 4/2012 | Fisher et al. |
| 2015/0166394 | A1 | | 6/2015 | Marjanovic et al. |
| 2016/0207820 | A1 | | 7/2016 | Cleary et al. |
| 2017/0036414 | A1 | * | 2/2017 | Notsu ...................... B60J 1/008 |

OTHER PUBLICATIONS

Peugeot RCZ; 2015; Wikipedia; whole document (Year: 2023).*
Toasted Meter—Last editor: "Peugeot RCZ—Wikipedia", Mar. 21, 2019, pp. 1-8, XP002790586, Retrieved from the internet: [Retrieved on Apr. 4, 2019], p. 1, Figure 1. https://en.m.wikipedia.org/wiki/Peugeot_RCZ.
Conceptcarz: "2007 Peugeot 308 RC Z Concept", Jan. 1, 2010, pp. 1-4, XP00270}90587, Frankfurt motor show Retrieved from the internet: [Retrieved on Apr. 4, 2019] https://www.conceptcarz.com/view/photo/212569,13919/2007-peugeot-308-rc-z-concept_photo.aspx.

* cited by examiner

PRIOR ART

VEHICLE GLAZING HAVING A SHARPLY CURVED PORTION AND THE METHOD FOR BENDING

FIELD OF THE INVENTION

The present invention relates generally to methods for bending vehicle glass layers having complex shapes. Specifically, the present invention relates to methods for forming glass articles having sharply curved complex shapes on the surface of the glass.

BACKGROUND OF THE INVENTION

In response to the regulatory requirements for increased automotive fuel efficiency as well as the growing public awareness and demand for environmentally friendly products, automotive original equipment manufacturers, around the world, have been working to improve the efficiency of their vehicles.

One of the key elements of the strategy to improve efficiency has been the concept of light weighting. Often times, more traditional, less expensive, conventional materials and processes are being replaced by innovative new materials and processes which while sometime being more expensive, still have higher utility than the materials and processes being replaced due to their lower weight and the corresponding increase in fuel efficiency. Vehicle glazing has been no exception.

Another of the key elements of the strategy to improve efficiency is the concept of aerodynamic. When automobile companies design a new vehicle they take into consideration the automobile drag coefficient in addition to the other performance characteristics. Aerodynamic drag increases with the square of speed; therefore it becomes critically important at higher speeds. Reducing the drag coefficient in an automobile improves the performance of the vehicle as it pertains to speed and fuel efficiency. There are many different ways to reduce the drag of a vehicle.

For many years, the standard automotive windshield or laminated roof, backlites had a thickness of 5.4 mm. In more recent years, we have seen the typical thickness decrease to 4.75 mm. Today, windshields with a 2.1 mm outer ply, a 1.6 mm inner ply and a 0.76 mm plastic bonding interlayer, totaling just under 4.5 mm in total thickness, are becoming common. This is at or very near the limits of how thin an annealed soda-lime glass windshield can be while still retaining safety and durability characteristics.

It has been a challenge to create new designs of vehicle glazing, where current designs are far from simple flat shapes. The challenge is to get a complex shape of thin flat glass layers. Optical clarity of the glass layer is extremely important. Standard molding techniques used for bending and reshaping glass layers tend to imprint any irregularities the mold tooling may have on the glass surface. Additionally, the demand for tighter controlled deformations (e.g., bends) and thinner glass windshields, typically in automotive industry of about 5 mm or less, means that the traditional processes for bending glass layers are not suitable as they are unable to cleanly create the necessary structures.

For example, patent document U.S. Pat. No. 3,865,680 describes a window comprising one or more glass layers having a sharply bent portion extending from edge to edge across a dimension of the sheet, a pattern of electroconductive material comprising an elongated electroconductive portion bonded to one or more of said sheets in said sharply bent portion and approximately coextensive with the sharply bent portion, and further comprising an additional edge portion of electroconductive material bonded to the glass sheet extending from each end of said elongated electroconductive portion from a narrow edge portion contacting said elongated portion to a wider edge portion remote from said elongated portion. The contacting portion of the edge portion preferably having an electrical resistance per unit length that approximates that of the elongated portion while the remote, wider edge portion having a lower electrical resistance.

Figure 1:
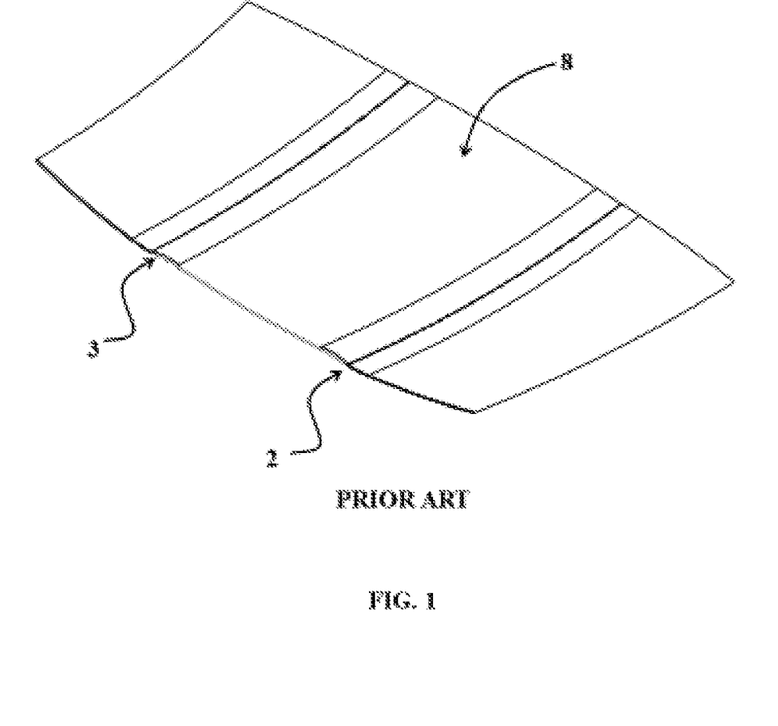
FIG. 1 shows a roof from the prior art having two curved portions having a sharp V-bend.

The patent document U.S. Pat. No. 3,865,680 refers to a window having a bent portion extending from edge to edge as shown in FIG. 1, but this document is silent about a glazing comprising a sharply curved portion having bent portions described by radiuses which change their orientation.

In the prior art the sharp bent portion is composed by at least one radius, said radius in the prior art are greater than 100 mm, such as in U.S. Pat. No. 3,865,680 wherein a sharp V-bend disposed centrally across the window from top edge to bottom edge such that the angle between a first main portion 12 and a second main portion 14 is 163 degrees at the top edge gradually decreasing to 154 degrees at the bottom edge.

Thus, there is a need for processes which allow retention of a high level of flatness in certain areas of the glazing, and creation of sharply curved portions. Embodiments address these needs by allowing for bending and shaping glass layers using targeted heating.

Additionally, in the prior art there are vehicle roofs such as the Peugeot RCZ which has two pronounced radius greater than 100 mm. This vehicle uses a panoramic roof with two pronounced radiuses, which give it, according to its specifications, a greater aerodynamic performance. These radiuses are so pronounced that are known as double bubble roof and occupy the entire width and length of the roof vehicle.

It is to be understood that the following detailed description is merely exemplary, and is intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF SUMMARY OF THE INVENTION

The present invention relates to a vehicle glazing, comprising at least one glass layer, at least one sharply curved portion on said at least one glass layer extending along the surface thereof. Said at least one sharply curved portion comprises a first bent portion described by a first radius and a second bent portion described by a second radius, wherein the point where the radiuses of the first and second bent portions change their orientation generate an inflection point. The radiuses of curvature of the first and second bent portions are described by a radius of less than 150 mm.

The present invention also discloses a method for bending a vehicle glazing having at least one sharply curved portion, the method comprises the step of: providing at least one glass layer; pre-bending said at least one glass layer by gravity bending, press bending, a combination thereof or any other well-known bending technique; locally heating at least one portion of the surface of said at least one glass close to its softening point by means of a laser source; and bending said at least one glass layer in said at least one portion locally heated, so that at least one sharply curved portion is created.

The present invention also discloses a method for bending a vehicle glazing having at least one sharply curved portion, the method comprises the step of: providing at least one glass layer, locally heating at least one portion of the surface of said at least one glass close to its softening point by means of a laser source; bending said at least one glass layer in said at least one portion locally heated, so that at least one sharply curved portion is created; and bending said at least one glass layer having at least one sharply curved portion to its final shape by gravity bending, press bending, a combination thereof or any other well-known bending technique.

Advantages of the Present Invention

Prevents glass wrinkles during bending and/or lamination.
Provides efficient means of bending glass.
Allows for bending of different glass compositions for use in the same laminate.
Allows for sharply curved portions on a single glass with small radius.
Allows to reduce drag coefficient of the vehicle.

REFERENCE NUMBERS

1 Inflection point
2 First radius
2 Second radius
4 Glass
6 Laser
7 Press-bending
8 Outer glass layer
9 Inner glass layer
10 Windshield/roof
11 Point in the center of the glass
12 Beginning of the path laser
13 End of the path laser
14 Point on the edge of the glass
17 Plastic bonding interlayer
18 Mold
19 Gravity bending
21 Pre-bent glass

DETAILED DESCRIPTION OF THE INVENTION

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

Annealed glass is glass that has been slowly cooled from the bending temperature through the glass transition range to relieve any stress in the glass. In a laminate, two layers of annealed glass are bonded together using a layer of thermo plastic bonding interlayer. If the laminated glass should break, the plastic bonding interlayer holds the shards of glass together, helping to maintain the structural integrity of the glass. The shards of broken glass are held together much like the pieces of a jigsaw puzzle. A vehicle with a broken windshield can still be operated. On impact, the plastic bonding interlayer also helps to prevent penetration by the occupant or by objects striking the laminate from the exterior.

Heat strengthened glass, with a compressive strength in the range of 70 Mpa, can be used in all vehicle positions other than the windshield. Heat strengthened, tempered, glass has a layer of high compression on the outside surfaces of the glass, balanced by tension on the inside of the glass. When tempered glass breaks, the tension and compression are no longer in balance and the glass breaks into small beads with dull edges. Tempered glass is much stronger than annealed laminated glass. The minimum thickness limits of the typical automotive heat strengthening process are in the 3.2 mm to 3.6 mm range. This is due to the rapid heat transfer that is required. It is not possible to achieve the high surface compression needed for a full temper with thinner glass using the typical low pressure air quenching systems.

Glass can also be chemically tempered. In this process, ions in and near the outside surface of the glass are exchanged with ions that are larger. This places the outer layer of glass in compression. The maximum strength of chemically tempered soda lime glass is limited. However, with some other glass compositions, compressive strengths in excess of 700 Mpa are possible. The practice of chemically tempering glass is well known to those of ordinary skill in the art and shall not be detailed here.

Unlike heat tempered glass, chemically tempered glass breaks into shards rather than beads. This property allows for its use in windshields. However, in standard windshield thicknesses chemically strengthened glass would actually be too strong. In the event of a crash and a head impact, the windshield must break, absorbing the energy of the impact rather than the head of the occupant. Therefore, depending upon the tempered strength, thicknesses of 1.6 mm or less must typically be used.

The majority of the vehicles on the road today have windshields and roofs that were made using gravity bending process. In this process, the glass layers that form the laminate are placed onto a ring type mold which supports the glass near the edges, or a full surface mold, and heated. The glass softens and sags to shape under the forces of gravity. Sometimes, for more complex shapes, gravity process is assisted by pneumatic pressure, a partial or full surface pressing, and/or vacuum. As the glass layers to be laminated are bent in sets, the surfaces are almost a perfect match.

Press bending is performed by pressing a heated glass layer between complementary curved molds so that the heated glass layer is bent to conform to the curved shape of the molds. One type of press bending system includes a horizontal conveyor on which glass layers are conveyed in a generally horizontally extending orientation for the heating and also includes an upper mold that is located above the conveyor at a bending station. A lower mold is moved upwardly from below the conveyor to lift each heated glass layer upwardly toward the upper mold for the press bending operation whereupon a vacuum is drawn at the upper mold to secure the glass layer as the lower mold is moved downwardly. Thereafter, a transfer mold is moved horizontally under the upper mold and receives the press bent glass layer for subsequent transfer therefrom. Normally, the transfer mold is formed as an open center ring and transfers the press bent glass layer to a quench station where tempering is performed. This type of press bending system can be utilized with either a gas hearth or roller type conveyor. However, with a gas hearth conveyor where the glass layers are conveyed on a thin film of pressurized gas, a groove has to be provided in the hearth to permit the lower mold to move downwardly below the conveyor so that the heated glass layer can be conveyed over the lower mold in preparation for the upward movement of the lower mold for the press bending operation. Likewise, a roller conveyor utilizing this type of press bending system requires that the lower mold be of the segmented type so as to be movable upwardly between the spacing between the rolls, and full engagement with the periphery of the glass layer being pressed is thus not possible.

In carrying out the above object, the press bending system of the invention includes a furnace having a heating chamber for providing a heated ambient for heating glass layers and also having a conveyor for conveying the heated glass layers in a generally horizontally extending orientation. An upper mold of the system is located above the conveyor and has a downwardly facing curved shape. A vacuum drawn at the upper mold and upward gas flow from below the conveyor provide a preferred means for supplying a differential gas pressure to a heated glass layer on the conveyor below the upper mold to support the glass layer against the downwardly facing curved shape of the upper mold at a location above the conveyor. A lower mold of the system has an upwardly facing curved shape and is mounted for horizontal movement at an elevation above the conveyor from a first position adjacent the upper mold to a second position below the upper mold and the heated glass layer supported by the upper mold. An actuator that moves the upper mold vertically provides a preferred means for providing relative vertical movement between the upper and lower molds to press bend the heated glass layer between the upper and lower molds. A transfer mold of the system receives the bent glass layer from the upper mold for horizontal movement there from for cooling in the bent shape.

When gravity bending is used, due to the low weight of the thin glass layers, the edges of the thin glass have a tendency to lift and form wrinkles. If the glass layers are of different compositions, with softening points that are too far apart, it may not be possible to gravity bend the different compositions simultaneously on the same mold as the glass with the lower softening point will become too soft leading to marking and distortion. In this case, the different glass types must be bent separately. Also, due to the low weight of the glass layers, they do not sag under their own weight in the same predictable and repeatable way that thicker glass does. Another problem is that the glass may begin to sag too soon, before the entire layer of glass has become soft enough.

Singlet pressing also has problems. The primary one is that as the glass is conveyed through the heating section on rolls it tends to bend under its own weight as it softens resulting in the leading edge hitting the rollers and even falling through.

Lamination also can presents problems for complex geometry. Due to bending deviation and small mismatch between the surface, it can be difficult to get the glass to conform and to bond to the other glass layers in the laminate. This can lead to delamination, trapped air, distortion and wrinkles.

The present invention provides sharply curved portions along different portions of the surface of the glass, specifically from one edge and progressively disappearing along the surface of the glazing. However, in some embodiments, the sharply curved portion is extended from edge to edge across a dimension of the glazing. Additionally, in preferred embodiments, the sharply curved portions have radiuses between 5 mm to 150 mm.

The instant invention provides a product and method for a vehicle glazing having at least one sharply curved portion with a minimum radius. Additionally, the present invention resolves the problem of making a small sharply bent with radiuses less than or equal to 150 mm, preferably less than or equal to 100 mm, more preferably less than or equal to 50 mm, even more preferably less than or equal to 20 mm.

Figure 5:
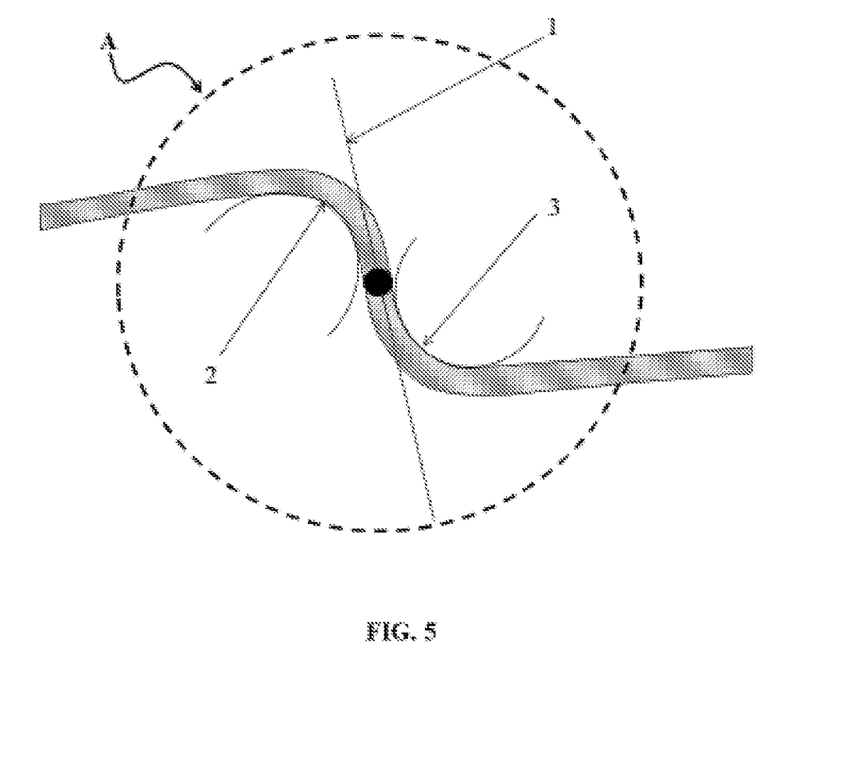
FIG. 5 shows the detail of a sharply curved portion of a glazing of the present invention.

The vehicle glazing of the present invention, comprises at least one glass layer; at least one sharply curved portion on said at least one glass layer extending along the surface of the glazing; wherein the sharply curved portion comprises (as shown in FIG. 5): a first bent portion described by a first radius (2) and a second bent portion described by a second radius (3), wherein the point where the radiuses of the first and second bent portions change their orientation generate an inflection point (1); wherein the radius of curvature of the first and second bent portions are described by a radius of less than 150 mm.

Figure 2:
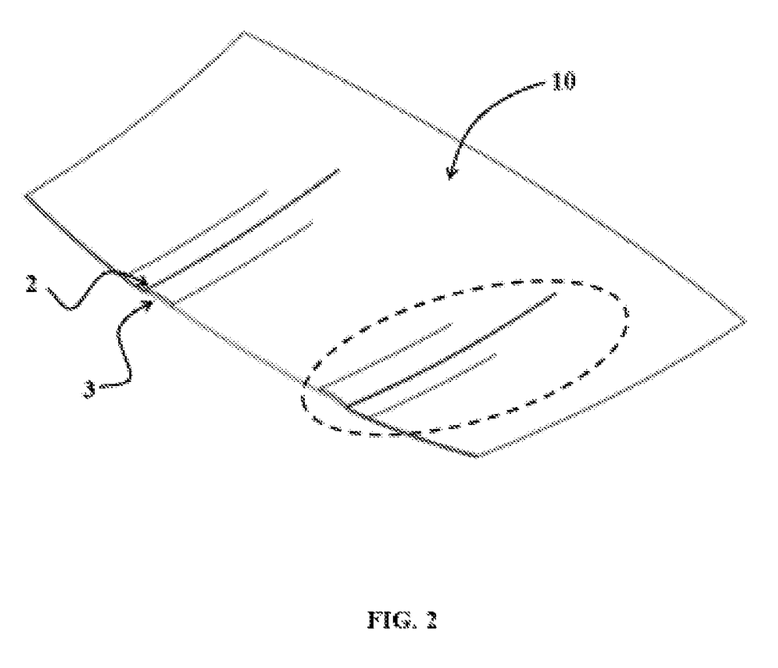
FIG. 2 shows an embodiment of a roof of the present invention having sharply curved portions extending from one edge of the glazing and progressively disappearing along the surface of the glazing.

FIG. 2 shows an embodiment of a windshield (10) with two sharply curved portion that start from one edge and progressively disappearing across the surface of the glass. The highlighted area shows that the curved portion disappears in any part of the surface of the glass. It is also shown two radiuses (2) and (3) that provide in one embodiment an S-shaped portion that disappears along the surface of the windshield (10).

In the present invention the sharply curved portions on a vehicle glazing such as a roof, a windshield or a backlite enables to reduce drag and lift coefficients of the vehicle. In some embodiments, the drag reduction is 4 counts, whereas the lift reduction is 10 counts.

Figure 6:
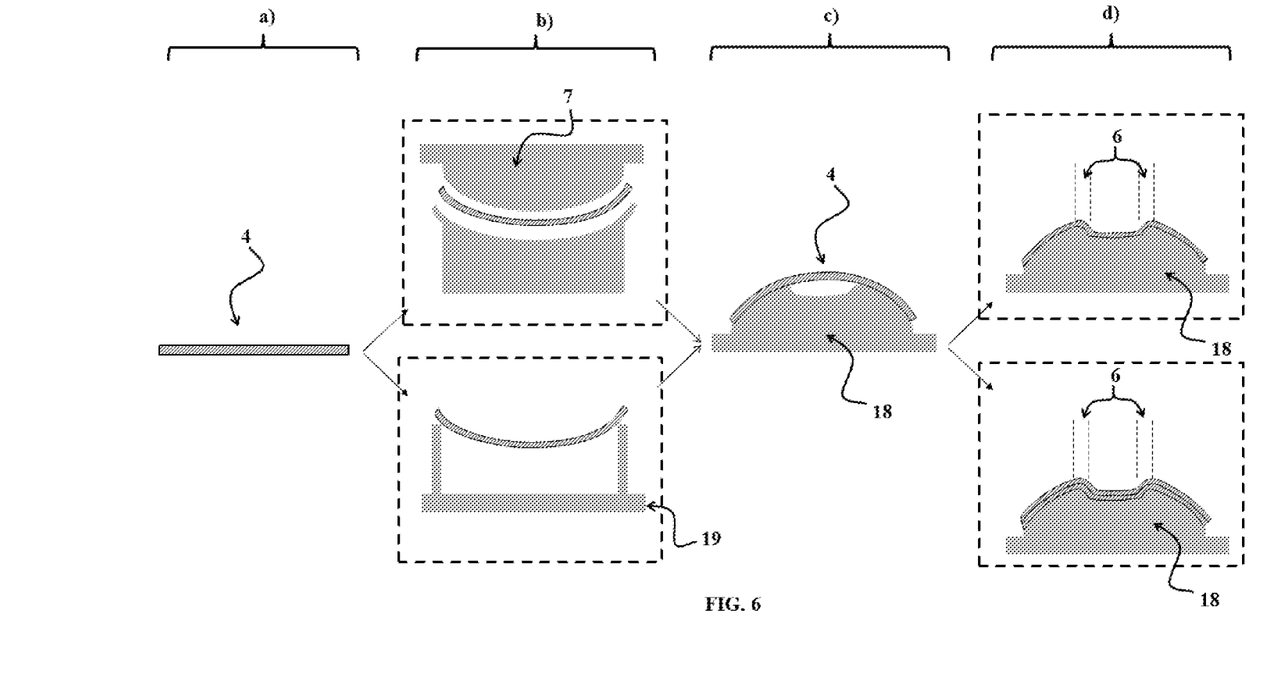
FIG. 6 shows an embodiment of the method of the present invention, wherein a flat glass is bent by either gravity or press bending, then the glass is subjected to a local heating, resulting in a windshield with sharply curved portions.
Figure 7:
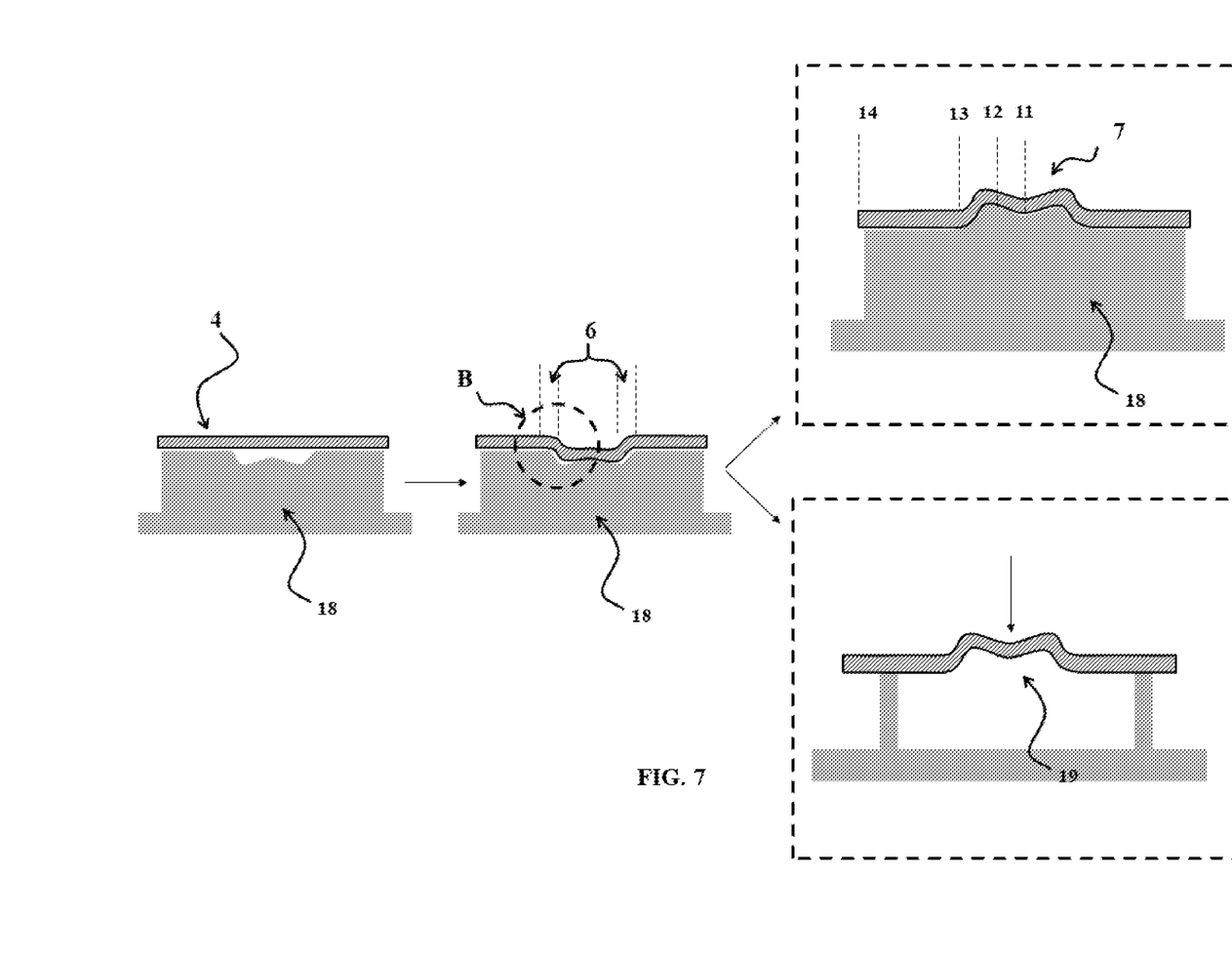
FIG. 7 shows an embodiment of the method of the present invention, wherein a flat glass is located over a mold, then the glass is subjected to a local heating to shape two sharply curved portions, after that, the glass is rotated 180 degrees and finally the flat parts of the glass are gravity or press bent.

The sharply curved portion on the vehicle glazing is created with a laser (6) source (as shown in FIGS. 6 and 7), wherein the process consists of applying heat locally in the area wherein the curvature of the glass should be carried out. The embodiment of FIG. 2 shows a glass layer that can be made by one single glass layer or can be laminated with at least another one glass layer. It should be noted that the present invention is also related to a laminate with a plurality of glass layers, all of them being curved with the laser method of the present invention in order to get sharply curved portions along the surface of the laminate.

Figure 3A:
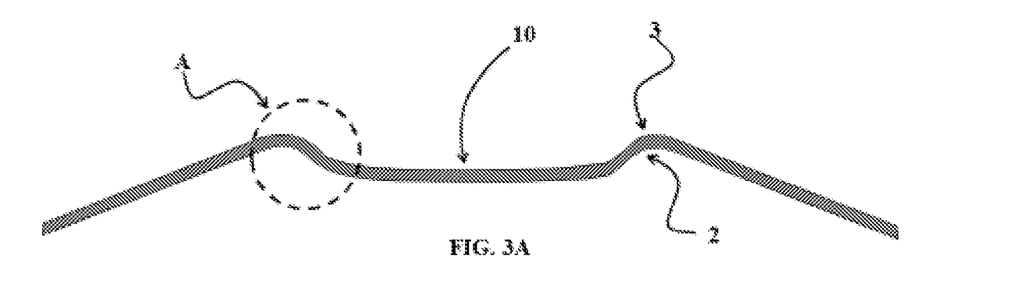
FIG. 3A shows the cross section of the embodiment of the roof of FIG. 2.
Figure 3B:
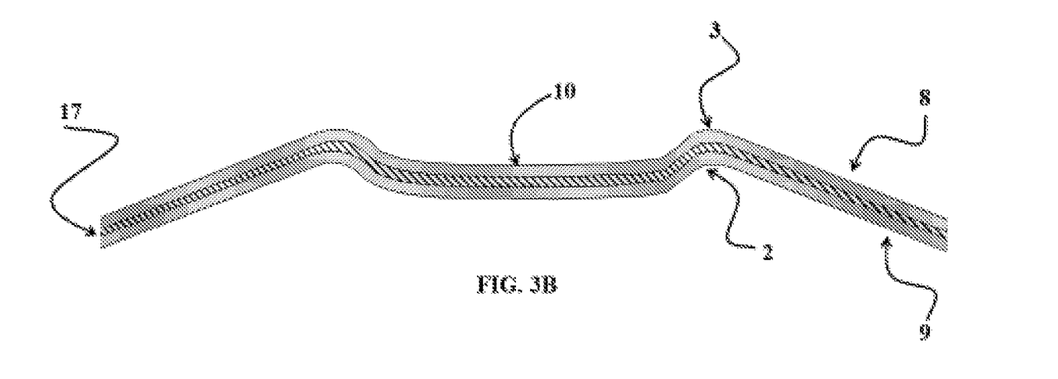
FIG. 3B shows the cross section of a laminated roof of the present invention, with a similar shape of the embodiment of FIG. 2.

FIG. 3A shows the cross section of the roof of FIG. 2, wherein it is comprised by a single glass layer with two bent curved portions. It should be understood that the glass layer or glass layers can have a plurality of sharply curved portions along the surface of the glass. It should be noted that the present invention allows the creation of sharply curved portions by performing a laser (6) process over the surface of the glass. FIG. 3B shows the cross section of a laminated windshield (10) having at least one plastic bonding interlayer (17).

Figure 4A:
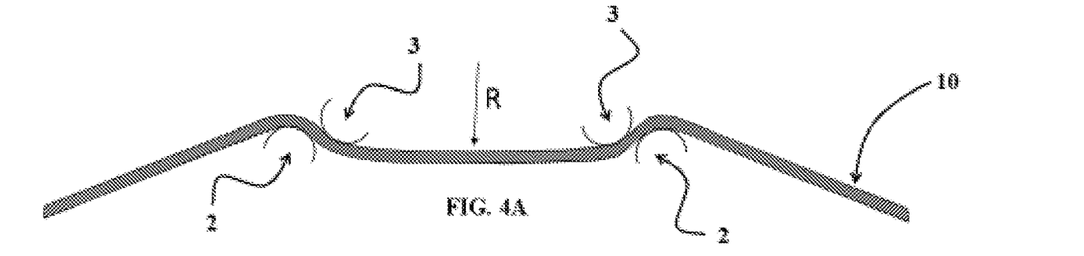
FIGS. 4A, 4B and 4C show different embodiments of glazings of the present invention having different sharply curved portions with different radiuses.
Figures 4B, 4C:
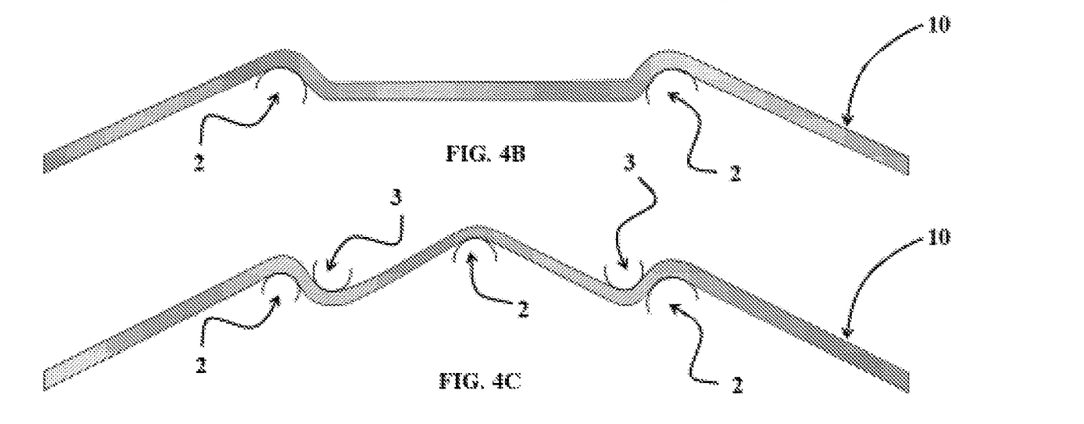

FIGS. 4A, 4B, 4C show different embodiments of the present invention, wherein it can be seen the cross section of windshields (10) having curved portions with small radiuses. FIG. 4A shows a curved windshield (10) having two curved portions with a first radius (2) and a second radius (3) of less than 20 mm. FIG. 4A shows also a big radius (R) which is a typical radius commercially available. In some embodiments this radius is 2000 mm. FIG. 4B shows the cross section of another embodiment of the present invention, where there are two curved portions with small radius (2) connected through flat portions. FIG. 4C shows the cross section of another embodiment, wherein there are at least three curved portions with two small radiuses each one.

FIG. 5 shows the detail of a sharply curved portion of the windshield (10) of FIG. 4A, the windshield includes a first bent portion described by a first radius (2) and a second bent portion described by a second radius (3), wherein the point where the radiuses of the first and second bent portions change their orientation generate an inflection point (1). The inflection point (1) is the point wherein the first bent curvature changes its course and/or orientation generating a second bent curvature. It should be noted that both curvatures might have similar or different radiuses.

The point of inflection (1) is the point at which the sharply curved portion becomes convex to concave or from concave to convex, as is shown in FIG. 5. The present invention provides windshields allowing to have complex shapes such as curvatures having small radiuses (2) and (3). These curvatures (see FIGS. 6 and 7) are produced by the application of local heating by means of a laser source over the surface of the glass (4). The laser (6) source should be understood as the application of precisely power and heat over the surface of the glass (4), in such a way that the bending temperature is reached. The laser (6) is able to control the heat over specific areas and also the depth of penetration of heat power can also be controlled. This would allow the glass windshield to modify the shape by increasing or reducing the curve radiuses.

It has been found that the limit to provide small radiuses is the thickness of the glass. For instance, if the glass has a thickness of 2 mm, the method of the present invention allows the curvature of portions of the glass having a radius of 2 mm. In preferred embodiments, the present invention can reach sharply curved portions with radiuses having a minimum thickness from 0.5 mm to 5 mm.

In some embodiments, local heating with laser (6) can be combined with other bending methods, such as press or gravity bending. As will be explained in one of the embodiments of the present invention, a press bending (7) process can be carried out after or at the same time the local heating is performed in an area of the glass (4).

Conventional bending processes like, press bending (7) or gravity bending (19) allows curvatures with big radiuses, higher than 150 mm. It is almost impossible to reach radiuses less than 50 mm using such bending processes. As described in the background, there is no teaching on how to reach sharp curvatures with a radius of less than 100 mm, and much less having complex shapes in a windshield wherein the complex shape begins from one edge of the glass and progressively disappear along the surface of the glass like is shown in FIG. 2. The present invention uses the technique of applying local heating in the glass (4) with a laser (6). Such technique allows the parameterization of the power and length of the line of heat appliance on the surface of the glass (4).

FIG. 3B, shows an exemplary embodiment where the glazing comprises a laminated glass. Laminated safety glass is made by bonding two layers of glass, the outer glass layer (8) and the inner glass layer (9) of annealed glass together using a plastic bonding interlayer (17) comprised of a thin layer of transparent plastic or thermo plastic interlayer.

The plastic bonding interlayer (17) has the primary function of bonding the major faces of adjacent layers to each other. The material selected is typically a clear plastic. For automotive use, the most commonly used bonding interlayer (17) is polyvinyl butyl (PVB). In addition to polyvinyl butyl, ionoplast polymers, ethylene vinyl acetate (EVA), cast in place (CIP) liquid resin and thermoplastic polyurethane (TPU) can also be used. Interlayers (17) are available with enhanced capabilities beyond bonding the glass layers together. The invention may include interlayers (17) designed to dampen sound. Such plastic bonding interlayers (17) are comprised whole or in part of a layer of plastic that is softer and more flexible than that normally used. The plastic bonding interlayer (17) may also be of a type which has solar attenuating properties.

Automotive plastic bonding interlayers (17) are made by an extrusion process. A smooth surface tends to stick to the glass, making it difficult to position on the glass and to trap air. To facilitate the handling of the plastic bonding interlayer and the removal or air, deairing, from the laminate, the surface of the plastic is normally embossed. Standard thicknesses for automotive PVB interlayer at 0.38 mm and 0.76 mm.

To make a sharply curved portion in a laminated glass, it would be advantageous that each glass in the laminate has a thickness from 0.5 mm to 5 mm. This allows to have a thinnest laminated glazing with sharply curved portion having radius of less than 20 mm.

On the other hand for tempered glass layers, the glass layers may be annealed or strengthened. There are two processes that can be used to increase the strength of glass. The first one is the thermal strengthening, in which the hot glass is rapidly cooled (quenched) and the second one is chemical tempering, in which achieves the same effect through an ion exchange chemical treatment. In the chemical tempering process, ions in and near the outside surface of the glass are exchanged with ions that are larger. Compressive strengths of up to 1,000 MPa are possible.

To make a sharply curved portion in a tempered glass, it would be advantageous that the glass has a minimum thickness from 2.5 mm to 5 mm.

There are many materials that are classified as glass and used like glass layers in a vehicle glazing. Glass (4), as used in this document, includes but are not limited to: the common soda-lime variety typical of automotive glazing, as well as aluminosilicate, alkali aluminosilicate, lithium aluminosilicate, borosilicate, glass ceramics, and other inorganic solid amorphous compositions which undergo glass transition and are classified as glass, included those that are not transparent. The term glass also includes glass like ceramic materials.

Making reference to FIG. 6 that represents a method for bending a vehicle glazing having at least one sharply curved portion, comprises:

providing at least one flat glass layer (4);

pre-bending said at least one glass layer by gravity (19) or press bending (7);

locally heating at least one portion of the surface of said at least one glass (4) by means of a laser (6) source (it should be noted that the forming of complex shapes can be programmed depending on the design, wherein the limit of the curvature is the value equivalent to the thickness of the glass); and bending said at least one glass layer in said at least one portion locally heated, so that at least one sharply curved portion is created.

In the embodiment depicted in FIG. 6, the method begins by providing a flat glass (4) layer which then is bent by any means available in the state-of-the-art. For instance, it can be bent by carrying out a press-bending (7) process or a gravity bending (19) process.

The optional step of pre-bending layers gives a preform shape, intermediate between the planar glass (4) and the desired final shape. This pre-bending may also give to the periphery of the glazing its final shape, while the central part is only outlined. The existence of a preferred pre-bending when the final shape has relatively sharp bends, especially when the final shape has curvatures in orthogonal directions (double curvature).

Furthermore, in the gravity bending (19) process of the pre-bending step, the glass layers that form the laminate are placed onto a ring type mold which supports the glass layers (4) near the edges and heated and allowed to sag to shape under the force of gravity acting on the mass of the glass (4). The glass soften and sag to shape under the forces of gravity. Sometimes, gravity bending (19) is assisted by pneumatic pressure, a partial or full surface pressing, and/or vacuum.

An alternative bending process that can be performed in the glass layers of the present invention, specifically on the pre-bending step of the method is the press bending (7). The press bending (7) process requires that the glass (4) is located over a bending mold. Then the mold is heated to the softening point of the glass (4), that its around 650° C., depending of the viscosity of the glass, and finally is applied a specific pressure over the glass with a press-bending (7), until the glass acquire the shape of the bending mold.

Afterwards, the bending requires the elevation of temperature to reach the softening point temperature of the glass that is going to be bent. Then, pressure is applied with a press mold in order to acquire the desired curvature, and then cooling the glass in a controlled way reaching a temperature below the annealing temperature of the glass.

In the step of locally heating the surface of the glass close to its softening point, it is made by means of a laser (6) source. The glass is placed on a graphite mold or a metal mold (18). Then, a laser (6) is applied to the area where the glass is going to be locally heated. The local heat is applied in order to shape sharply curved portions on the inner glass layer (9) and outer glass layer (8) forming radiuses less than 10 mm. The temperature of the laser can reach the softening point of the glass, allowing the curvature of the windshield. The laser allows the glass to become viscous and therefore malleable allowing the glass to shape sharply curved portions.

The laser (6) beam moves along the surface of the glass with absolute precision, following a defined trajectory. When necessary, the laser (6) beam stops, changes position and continues heating the inner glass layers (9) and/or outer glass layers (8).

As long as the laser heats, the glass layers begin to soften at the portions that the laser (6) has heated and, begin to bend by gravity, the heated portions sink as if they were made of thick viscous material. Once the desired shape has been achieved, the laser stops and the glass cools. The result is a sharp curved portion with radius less than or equal to 150 mm, preferably less than or equal to 100 mm, more preferably less than or equal to 50 mm, even more preferably less than or equal to 20 mm.

The laser used in the present invention is a modified high power laser system with an output power of ~2.0 kW and allows a flexible forming of flat glass (4) products. Due to the high absorption of most glasses in the mid infrared wave length range the CO2 laser can be used very efficiently. This laser has the potential of laser radiation for the partial forming of flat glass (4) and the deformation of glass materials depending on material thickness and the thermal expansion coefficient. Smaller and smaller glass components with more complex geometries can be processed because of the high focusability of the laser beam. With this intensity, it is possible to achieve forming depths of up to 6 mm.

When the glasses are formed with laser radiation, the base material is partially heated beyond the softening point. In this process the materials are only brought to a viscoplastic state, where at the heated volume is neither completely molten nor sublimated. An essential process advantage of the laser treatment compared to conventional glass treatment procedures is the locally highly limited and controllable heat input into the component. The change in shape is very often carried out without additional tools or molds, as it is typical for conventional glass forming procedures, pressing or blowing. Centrifugal forces, created through rotational movements or capillary forces which partially break the surface tension of the glass are also utilized.

The good focusability of the laser radiation to very small focus diameters allows very small bending radiuses compared to classical forming procedures. The necessary process time for the forming of an edge length of 150 mm is ~3 seconds.

With the laser process, relatively low intensities are applied in order to keep the material removal through vaporization as low as possible. That is why a galvanometrically driven mirror is used which enable scanning speeds of up to 8 m·s-1. Furthermore, multiple scans along the geometries to be formed allow a quasi-simultaneous heating of the interaction zone. The integration of a fast-moving telescope mirror enables a dynamic focusing in order to form different areas of the glass component. Temperature is an essential process parameter for the forming process. Temperature ranges can be analyzed during the treatment through the integration of temperature measuring systems, thermographic camera or pyrometer. For geometries where a homogeneous heating is not possible, a control circuit can be made from the received temperature signal and the laser power can be adjusted according to the effective temperature value. The high process speed requires fast PID-control algorithms.

The laser can bring high temperatures into the glass (~900° C.) and curved different types of glass such as soda-lime, borosilicate and aluminosilicate.

Additionally, the laser can acts on inner (9) and outer (8) glass in a zone less than 50 mm width to shape the sharp bent portion of the glass and wherein a sharp curved portion is of 100 mm can be made by a sagging process, wherein is need a sharp bent portion of 50 mm its can be made by a press-bending (7) process. The step d) bending the glass in the zone heated in step (c) by press bending (7), gravity bending (19), or sagging process.

To make a sharply curved portion in a laminated glass, it would be advantageous that each glass in the laminate has a thickness from 0.5 mm to 5 mm.

A wide variety of films are available that can be incorporated into a laminate. The uses for these films include but are not limited to: solar control, variable light transmission, increased stiffness, increased structural integrity, improved penetration resistance, improved occupant retention, providing a barrier, tint, providing a sunshade, color correction, and as a substrate for functional and aesthetic graphics. The term "film" shall include all of these as well as other products that may be developed or which are currently available which enhance the performance, function, aesthetics or cost of a laminated glazing. Most films comprise at least one plastic substrate. Most films do not have adhesive properties. To incorporate into a laminate, layers of plastic bonding interlayer are needed on each side of the film so as to bond the film to the other layers of the laminate.

After the method described above the hot laminated glass can be cooled at ambient temperature.

To make a sharply curved portion in a tempered glass said tempered glass has a minimum thickness from 2.5 mm to 5 mm.

FIG. 7 describes a second method for bending a vehicle glazing having at least one sharply curved portion, comprising:

providing at least one glass layer;
locally heating at least one portion of the surface of said at least one glass layer; and
bending said at least one glass layer having at least one sharply curved portion to its final shape.

The differences with the first method described in FIG. 6, lie partly in the order of the steps: a laser (6) source processing the surface of the glass along the surfaces of the outer and inner glass layers; and bending the flat glass (4) with sharply curved portions by gravity or press bending. The method allows bending curved portions for glass that have a flat section and then need a sharply curved portion. It is possible to provide sharply curved portions made of glass or glass-ceramics having at least one sharply curved portion.

The method disclosed in FIG. 7, requires that sharply curved portions be created on a flat glass (4) before bending it to its final shape. The process starts bending a portion of the flat glass (4) with the laser (6) described above, forming at least one sharply curved portion on the inner glass layer (9) and outer glass layer (8).

The flat glass is located over a mold (18), which optionally can have vacuum holes on its surface in order to suck the glass and attract the glass to the mold. After located the flat glass (4) on the mold (18) the laser (6) locally heats the portions where the glass needs to be sharply curved. Then, the glass should be rotated 180 degrees over a different mold, for final bending, either by a press-bending (7) or gravity bending (19) process.

In FIG. 7, after placing the flat glass on the mold (18) the laser source shapes the sharp curved portion on the glass. There is a flat section of the glass from the point on the edge of the glass (14) to the point of the end of the path laser (13). Adjacent to the flat section there is a section from the point of the end of the path laser (13) to the point of the beginning of the path laser (12) that describes the width of the laser.

Finally the section from the point of the beginning of the path laser (12) to the point in the center of the glass (11) is wherein the glass is bending by gravity bending or press bending process. The section from the point on the edge of the glass (14) to the point in the center of the glass (11) represents the middle of the glass.

In the method to shape sharply curved portion with good enough geometric tolerance to laminate the glass. This method enables to process of single glass and reach geometrical tolerance that enable good match between glasses for the assembly process, laminated glass with plastic bonding interlayer.

Additionally, the glass curve by means of gravity, press or vacuum and temperature the glass or glass-ceramic intermediate layers, the bending of the glass and glass-ceramic layers is performed simultaneously (bending-annealing) in order to assure parallelism. The process may take anywhere between 100 and 1000 minutes because it requires a slow cooling system in order to allow for the glass/glass, glass/glass-ceramic or glass-ceramic/glass-ceramic interfaces, which cool slower than the glass/air or glass-ceramic/air interfaces, to have lesser cooling rates than the maximum temperature gradient allowed by the material in order to avoid failures due to thermal shock.

After the method described above the hot laminated glass is cooled an ambient temperature.

To make a sharply curved portion in a tempered glass, it would be advantageous that said glass has a minimum thickness from 2.5 mm to 5 mm.

Example 1

In the method of present invention, the vehicles glass pane, preferably composed of thin soda-lime glass, with a thickness of 2.1 mm is pre-bent by a press-bending process or a gravity bending process for a laminated glass required in automotive applications and other variety of applications wherein is needed to have bent glass for geometric or functional requirements, such as in vehicles wherein is needed to precisely adjust the glass over the desired shape. At the same time, it is important that the laminated glass meets the optical requirements as needed for example in windshield vehicular glass, giving a glass with the minimum of optical defects.

For pre-bending process layers may be flat or pre-curved already prior to said step. They are preferably pre-curved. Before the pre-bending process the glass is heating up at a temperature of ~600° C. The glass is placed on a full mold and heated it close to its softening point, then a local laser source reaches a temperature of 900° C. to shape sharply curved portions on the inner and outer glass surfaces, around 40 mm width, to generate a sharply curved portion of the glass.

A sharply curved portion is formed on the inner and outer surface of the glass by the laser, said sharply curved portion that start from one edge and progressively disappear across the glass having a first bent, describing a radius from 2 mm, or less, to 50 mm in the inner surface, and adjacent to the first bent there is a second bent on the outer surface with a radius from 2 mm, or less, to 100 mm. There is an inflection point between the first bent and the second bent; the inflection point is the point wherein the first bent change its course and/or orientation generating a second bent with a different radius. The exemplified embodiment was constructed with the following dimensions:

Outer surface=2 mm to 5 mm
Inner surface=2 mm to 5 mm
Radius in the inner surface=2 mm to 50 mm
Radius in the outer surface=2 mm to 100 mm It is to be understood that both the foregoing general description and detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

What is claimed is:

1. A laminated vehicle glazing, comprising:
   at least two glass layers;
   at least one sharply curved portion formed on said at least two glass layers and extending along the surface thereof into a visible portion of the glazing;
   a plastic interlayer disposed between the two glass layers;
   wherein said at least one sharply curved portion comprises:
      a first bent portion described by a first radius and a second bent portion described by a second radius, wherein the point where the radiuses of the first and second bent portions change their orientation generate at least one inflection point; and
      wherein the radius of curvature of the first and second bent portions are described by a radius of less than 50 mm.

2. The laminated vehicle glazing of claim 1, wherein said at least one sharply curved portion is extended from one edge of the glazing and progressively disappearing along the surface thereof.

3. The laminated vehicle glazing of claim 1, wherein said at least one sharply curved portion is extended from edge to edge across a dimension of the glazing.

4. The laminated vehicle glazing of claim 1, wherein the radius of the curvature of the first and second bent portions are described by a radius of less than 20 mm.

5. The laminated vehicle glazing of claim 1, wherein each glass of said at least two glass layers are selected from the group consisting of soda-lime, borosilicate and aluminosilicate.

6. The laminated vehicle glazing of claim 1, wherein each glass in the laminated has thickness from about 0.5 mm to about 5 mm.

7. The laminated vehicle glazing of claim 1, wherein the vehicle glazing is a roof, backlite or a windshield.

8. The laminated vehicle glazing of claim 7, wherein the vehicle glazing allows to reduce the drag coefficient of the vehicle.

9. A method for bending a laminated vehicle glazing having at least one sharply curved portion, comprising:
   providing at least two glass layers;
   pre-bending said at least two glass layers;
   locally heating at least one portion of the surface of said at least two glass by means of a laser source; and
   bending said at least one glass layer in said at least one portion locally heated, so that at least one sharply curved portion on said at least one glass layer extends along the surface thereof into a visible portion of the glazing and comprises a first bent portion described by a first radius and a second bent portion described by a second radius, wherein the point where the radiuses of the first and second bent portions change their orientation generate at least one inflection point; and
   wherein the radius of curvature of the first and second bent portions are described by a radius of less than 50 mm.

10. The method of claim 9, wherein the locally heating step is carried out from one edge and progressively disappearing along the surface of said at least two glass layers.

11. The method of claim 9 further comprising the step of providing at least one plastic bonding layer; and wherein after the pre-bending step, further comprising the step of laminating said at least two glass layers and said at least one plastic bonding layer.

12. The method of claim 9, wherein the bending method is performed to the laminated glass layers either at the same time or individually one after the other.

13. The method of claim 9, wherein the bending step comprises the step of applying vacuum to said at least two glass layers.

14. A method for bending a laminated vehicle glazing having at least one sharply curved portion, comprising:
   providing at least two glass layers;
   locally heating at least one portion of the surface of said at least two glass layers;
   bending said at least two glass layers in said at least one portion locally heated, so that at least one sharply curved portion on said at least two glass layers extends along the surface thereof into a visible portion of the glazing and comprises a first bent portion described by a first radius and a second bent portion described by a second radius, wherein the point where the radiuses of the first and second bent portions change their orientation generate an at least one inflection point; and
   wherein the radius of curvature of the first and second bent portions are described by a radius of less than 50 mm; and
   bending said at least one glass layer having at least one sharply curved portion to its final shape.

15. The method of claim 14, wherein the bending step in which is created the at least one sharply curved portion comprises the step of applying vacuum to said at least two glass layers.

16. The method of claim 14, wherein the locally heating step is carried out from one edge and progressively disappearing along the surface of said at least two glass layers.

17. A glazing, comprising:
   a single glass layer;
   at least one sharply curved portion on said single glass and extending along the surface thereof into a visible portion of the glazing;
   wherein said at least one sharply curved portion comprises in its transversal section:
      a first bent portion described by a first radius and a second bent portion described by a second radius, wherein the point where the radiuses of the first and second bent portions change their orientation generate at least one inflection point; and
      wherein the radius of curvature of the first and second bent portions are described by a radius of less than 50 mm.

* * * * *